United States Patent
Kent et al.

(10) Patent No.: US 8,494,066 B2
(45) Date of Patent: *Jul. 23, 2013

(54) METHOD AND SYSTEM FOR LOW COMPLEXITY CHANNEL ESTIMATION IN OFDM COMMUNICATION NETWORKS USING CIRCULAR CONVOLUTION

(75) Inventors: Mark Kent, Vista, CA (US); Uri Landau, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 12/646,744

(22) Filed: Dec. 23, 2009

(65) Prior Publication Data
US 2011/0026618 A1 Feb. 3, 2011

Related U.S. Application Data

(60) Provisional application No. 61/229,248, filed on Jul. 28, 2009.

(51) Int. Cl.
*H04K 1/10* (2006.01)
(52) U.S. Cl.
USPC .......................................... 375/260; 375/148
(58) Field of Classification Search
USPC .................. 375/260, 267, 148; 370/208, 329, 370/342
See application file for complete search history.

(56) References Cited

U.S. PATENT DOCUMENTS

| | | | |
|---|---|---|---|
| 6,570,863 B1 * | 5/2003 | Kim et al. | 370/342 |
| 7,970,068 B2 * | 6/2011 | Arambepola et al. | 375/260 |
| 2007/0019748 A1 * | 1/2007 | Hoo et al. | 375/260 |
| 2007/0280366 A1 * | 12/2007 | Aytur et al. | 375/260 |
| 2009/0059961 A1 * | 3/2009 | Shukla et al. | 370/500 |
| 2009/0129493 A1 | 5/2009 | Zhang et al. | |
| 2009/0161781 A1 * | 6/2009 | Kolze | 375/260 |
| 2009/0185630 A1 * | 7/2009 | Yang | 375/260 |
| 2009/0323796 A1 * | 12/2009 | Futatsugi et al. | 375/232 |
| 2010/0067461 A1 * | 3/2010 | Kwak et al. | 370/329 |
| 2010/0158141 A1 * | 6/2010 | Hewavithana et al. | 375/260 |
| 2010/0195700 A1 * | 8/2010 | Ogawa et al. | 375/132 |
| 2011/0026619 A1 * | 2/2011 | Kent et al. | 375/260 |
| 2011/0026652 A1 * | 2/2011 | Kent et al. | 375/346 |
| 2011/0222393 A1 * | 9/2011 | Kwak et al. | 370/208 |

* cited by examiner

*Primary Examiner* — Emmanuel Bayard
(74) *Attorney, Agent, or Firm* — Sterne, Kessler, Goldstein & Fox P.L.L.C.

(57) ABSTRACT

A mobile device in an OFDM system receives an OFDM signal comprising a plurality of RS tones and data OFDM symbols. The received RS tones are extracted for channel estimation, which is performed by masking channel responses of the extracted RS tones. Pointers of the extracted RS tones are shifted so that the extracted RS tones are spaced in a subcarrier at regular intervals. Pointers of associated positive counted or indexed subcarriers are shifted one subcarrier lower while no pointer shifting on associated negative counted or indexed subcarriers. IFFT operation is applied to the resulting pointer shifted RS tones to determine the channel impulse responses. Desired channel taps are weighted using non-zero masking values, while undesired channel taps and/or channel tap replicas are weighted using zero. The masked channel impulse responses are back shifted in subcarrier prior to channel equalization.

20 Claims, 7 Drawing Sheets

METHOD AND SYSTEM FOR LOW COMPLEXITY CHANNEL ESTIMATION IN OFDM COMMUNICATION NETWORKS USING CIRCULAR CONVOLUTION

CROSS-REFERENCE TO RELATED APPLICATIONS/INCORPORATION BY REFERENCE

This application makes reference to, claims priority to, and claims benefit of U.S. Provisional Application Ser. No. 61/229,248 filed on Jul. 28, 2009.

This application also makes reference to:
U.S. application Ser. No. 12/646,869 filed on even date herewith; and
U.S. application Ser. No. 12/646,906 filed on even date herewith.

Each of the aforementioned referenced applications is hereby incorporated herein by reference in their entirety.

FIELD OF THE INVENTION

Certain embodiments of the invention relate to communication systems. More specifically, certain embodiments of the invention relate to a method and system for low complexity channel estimation in OFDM systems using circular convolution.

BACKGROUND OF THE INVENTION

Long Term Evolution (LTE) is a Third Generation Partnership Project (3GPP) standard that provides for an uplink speed of up to 50 megabits per second (Mbps) and a downlink speed of up to 100 Mbps. The LTE standard represents a major advance in cellular technology. The LTE standard is designed to meet current and future carrier needs for high-speed data and media transport as well as high-capacity voice support. The LTE standard brings many technical benefits to cellular networks, including Orthogonal Frequency Division Multiplexing (OFDM) and/or Multiple Input Multiple Output (MIMO) data communication. In addition, Orthogonal Frequency Division Multiple Access (OFDMA) and Single Carrier-Frequency Division Multiple Access (SC-FDMA) are used on the downlink (DL) and on the uplink (UL), respectively. In the LTE standard, bandwidth is scalable from 1.25 MHz to 20 MHz. This may suit the needs of different network operators that have different bandwidth allocations and also allow operators to provide different services based on spectrum availability. LTE is expected to improve spectral efficiency in 3G networks, allowing carriers to provide more data and voice services over a given bandwidth. LTE encompasses high-speed data, multimedia unicast and multimedia broadcast services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for low complexity channel estimation in OFDM systems using circular convolution, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for low complexity channel estimation in OFDM systems using circular convolution. In various embodiments of the invention, a mobile device in an OFDM communication system may be equipped with one or more RF receivers to receive OFDM signals from one or more transmit antennas, also named as ports or TX antennas. The received OFDM signals may comprise a plurality of reference signal (RS) tones and data OFDM symbols. The plurality of received RS tones may be extracted and utilized to perform channel estimation for each associated channel, namely a transmit-receive path. The channel estimation may be performed by masking channel responses of the extracted plurality of RS tones. The extracted plurality of RS tones may be irregularly spaced in a subcarrier due to, for example, counting out the DC subcarrier required in the LTE standard. Accordingly, pointers for subcarriers of the extracted plurality of RS tones may be shifted so that the extracted plurality of RS tones is spaced in the subcarrier at regular intervals. In this regard, pointers for corresponding positive counted or indexed subcarriers for the extracted plurality of RS tones may be shifted one subcarrier lower. No pointer shifting may be performed on associated negative counted or indexed subcarriers of the extracted plurality of RS tones. The channel impulse responses of the pointer shifted plurality of RS tones may be determined by applying an IFFT operation on the pointer shifted plurality of RS tones. A mask may be applied to associated channel taps of the determined channel responses. Desired channel taps of the determined channel impulse response may be weighted by a mask that zeros out the undesired channel taps and/or channel tap replicas of the determined channel impulse response. The masked channel impulse responses may be converted via FFT to corresponding frequency domain samples for frequency domain equalization. Pointers for the corresponding frequency domain samples may be shifted in a subcarrier back to the pointers of the extracted plurality of RS tones prior to channel equalization.

Figure 1A:
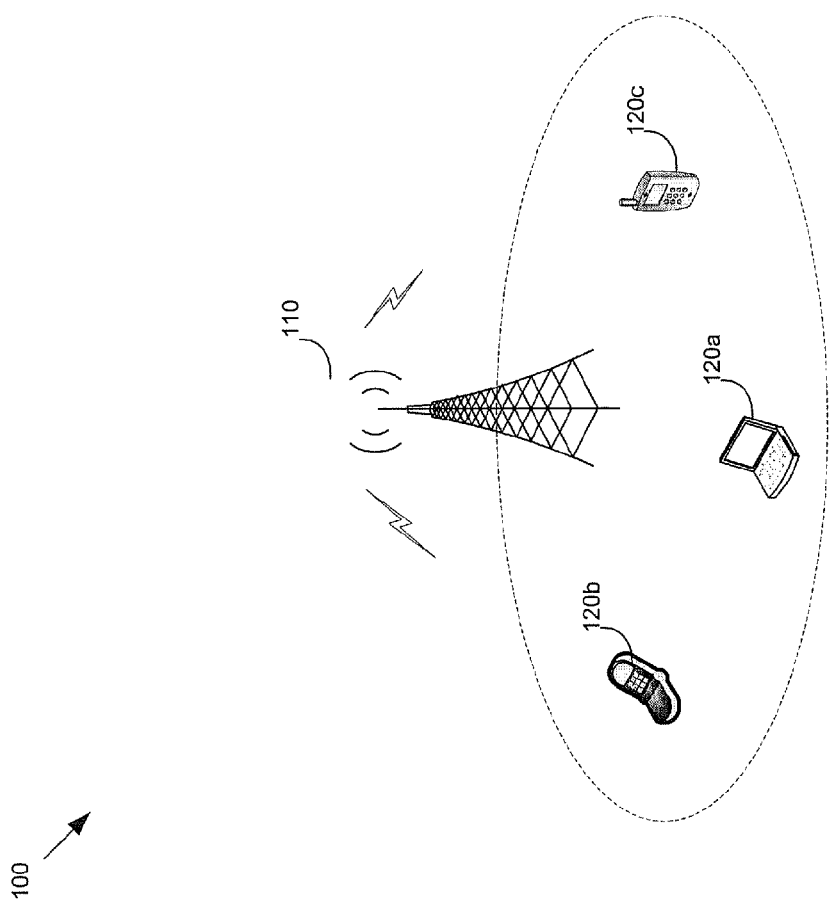
FIG. 1A is a diagram illustrating an exemplary cell in an OFDM based communication system that is operable to support channel estimation using a masking operation in time domain, in accordance with an embodiment of the invention.

FIG. 1A is a diagram illustrating an exemplary cell in an OFDM based communication system that is operable to support channel estimation using a masking operation in time domain, in accordance with an embodiment of the invention. Referring to FIG. 1A, there is shown an OFDM communication system 100. The OFDM communication system 100 comprises a base station 110 and a plurality of mobile devices, of which mobile devices 120a-120c are illustrated.

The base station 110 may comprise suitable logic, circuitry, interfaces and/or code that are operable to manage various aspects of communication, for example, communication connection establishment, connection maintenance and/or connection termination, over, for example, the LTE air interface. The base station 110 may be operable to manage associated radio resources such as, for example, radio bearer control, radio admission control, connection mobility control, and/or dynamic allocation of radio resources for associated mobile devices such as the mobile devices 120a-120c in both uplink and downlink communication. Physical channels and physical signals may be utilized for communication in both the uplink and the downlink communication. The physical channels such as P-SCH, S-SCH, BCH, PDCCH and PCFICH in LTE standard may carry information from higher layers and may be used to carry user data as well as user control information. The physical signals such as a reference signal may not carry information from higher layers and may be used for cell search and/or channel estimation, for example.

The base station 110 may be operable to transmit reference signals to associated mobile devices such as the mobile devices 120a-120c in a predefined grid of tones (subcarriers). RS tones of a reference signal may be located or inserted in both the frequency direction and in the time direction, respectively. The RS tones may be embedded in the data of OFDM symbols to be transmitted. The pattern of the inserted RS tones may be predetermined and known by both the transmitter and one or more corresponding receivers. For example, the RS tones may be inserted and transmitted at OFDM symbol 0 and 4 of each time slot depending on radio frame structure type and/or antenna port number. The base station 110 may be operable to index or count subcarriers used to transmit OFDM signals according to corresponding mappings in frequency spectrum. The transmitted OFDM signals may comprise RS tones and data OFDM symbols addressed to intended mobile devices such as, for example, the mobile devices 120a-120c. In the LTE standard, subcarriers may be located or spaced one tone per, for example, 15 KHz and 7.5 KHz. Subcarriers may be counted or indexed using either positive and/or negative integers at the zero crossing point of a DC subcarrier. The base station 110 may be operable to provide a vacant DC subcarrier (means no signal transmission over the DC subcarrier) to allow simplified receiver architecture such as, for example, a direct conversion receiver implementation. The vacancy of the DC subcarrier may block un-proportionally high interferences, for example, due to on-chip and/or local oscillator leakage. However, the vacancy of the DC subcarrier may result in the irregularities in the spacing of the RS tones and may cause distortions to channel estimation at the intended mobile devices such as, for example, the mobile devices 120a-120c.

A mobile device such as the mobile device 120a may comprise suitable logic, circuitry, interfaces and/or code that may be operable to communicate with a base station such as the base station 110 for services supported, for example, in the LTE standard. The mobile device 120a may be operable to initiate, maintain, and/or terminate communications with the base station 110 by performing various procedures such as, for example, cell search and/or channel quality reporting. The mobile device 120a may be operable to demodulate data OFDM symbols received from the base station 110 to identify transmitted bit streams over corresponding subcarriers.

The mobile device 120a may be operable to estimate channel conditions to determine changes in subcarrier on received OFDM signals. A change in subcarrier on the received OFDM signals may be a result of channel propagations. In order to account for time varying and frequency selective fading channels, the mobile device 120a may be operable to perform channel estimation using RS tones embedded in the received OFDM symbols. Time and/or frequency tracking may be achieved using the embedded RS tones in the channel estimation. The ability of the mobile device 120a to receive data may be bound by, for example, the quality of the channel estimation. Inaccurate channel estimation may limit capability of the mobile device 120a to remove channel effects and consequently impair the throughput of the mobile device 120a.

The mobile device 120a may be operable to perform channel estimation by applying a masking operation over channel taps (time domain) of the received RS tones. Desired channel taps may be reserved by being weighted with non-zero mask values. Undesired channel taps and/or channel tap replicas may be removed by being weighted using a zero mask value. Non-zero mask values may be stored and applied during channel estimation in order to achieve low complexity channel estimation. The low complexity channel estimation may provide a way for further simplification to achieve optimal channel estimation for wide class of channels in dynamic conditions. Due to counting out the DC subcarrier in the LTE standard, pointers of location index (RS frequencies) of the received RS tones may be shifted prior to channel estimation to overcome performance limitations that may exist due to irregular spacing between the RS tones.

Although pointer shifted RS tones are illustrated for the low complexity channel estimation in downlink, the invention may not be so limited. Accordingly, irregularly spaced RS tones may be utilized in the low complexity channel estimation. Moreover, using a masking operation in time domain on RS tones to estimate channels may be applied to any RS-tone based channel estimation without departing from the spirit and scope of various embodiments of the invention.

In an exemplary operation, the base station 110 may be operable to transmit OFDM signals over LTE air interface to an intended mobile device such as the mobile devices 120a. Subcarriers used to transmit OFDM signals to the mobile device 120a may be counted or indexed in either positive or negative integers at the zero crossing point of the DC subcarrier. The DC subcarrier may be vacant and may not be used for transmission. RS tones may be embedded in the OFDM signals for time and frequency tracking at the mobile device 120a. The RS tones may be inserted and transmitted in a predefined grid of RS tones (subcarriers). In the LTE standard, the RS tones may be irregularly spread or irregularly spaced due to the DC subcarrier counting out. At reception, the mobile device 120a may be operable to utilize the received RS tones for channel estimation in order to demodulate received OFDM signals. To reduce distortions created due to irregular spacing between the received RS tones, the mobile device 120a may be operable to shift pointers of the received RS tones (subcarriers) such that the resulting pointer shifted RS tones may be evenly or regularly spaced in subcarrier. The pointer shifted RS tones may be utilized for channel estimation. In this regard, a masking operation may be performed in time domain over channels taps of the pointer shifted RS tones to remove undesired channel taps. The masking operation may comprise an element-wise product between the channels taps of the pointer shifted RS tones and a predetermined mask. The masking operation may provide low complexity in term of computation and memory requirements in channel estimation. The undesired channel taps may be weighted with zero mask values, while desired channel taps may be weighted using non-zero mask values. The masked channel taps may be converted to corresponding frequency samples and back shifted in subcarrier for frequency domain channel equalization.

Figure 1B:
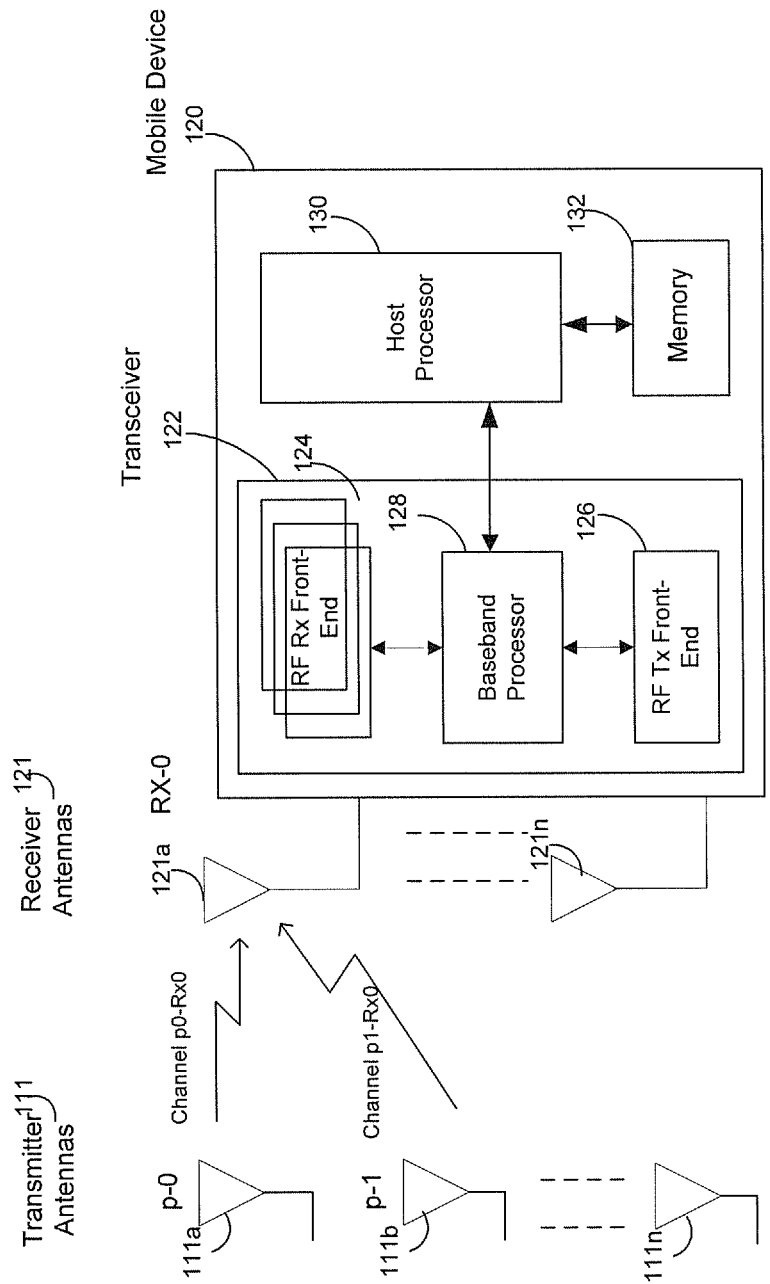
FIG. 1B is a block diagram of an exemplary communication device that may be operable to utilize a masking operation in time domain to achieve low complexity channel estimation in an OFDM system, in accordance with an embodiment of the invention.

FIG. 1B is a block diagram of an exemplary communication device that may be operable to utilize a masking operation in time domain to achieve low complexity channel estimation in an OFDM system, in accordance with an embodiment of the invention. Referring to FIG. 1B, there is shown a mobile device 120 comprising multiple antennas 121a-121n, a transceiver 122, a host processor 130 and a memory 132. The transceiver 122 comprises multiple radio frequency (RF) receiver (Rx) front-ends 124, a RF transmitter (Tx) front-end 126 and a baseband processor 128.

The multiple antennas 121a-121n, also named: ports or RX antennas, may comprise suitable logic, circuitry, interfaces and/or code that may be suitable for transmitting and/or receiving electromagnetic signals. In this regard, the multiple antennas 121a-121n may be operable to receive signals from corresponding multiple transmit antennas 111 (also named: ports or TX antennas). Each transmit-receive path is called a channel. For example, the FIG. 1B shows a channel between a transmit antenna 111a and a receive antenna 121a. The transceiver 122 may comprise suitable logic, circuitry, interfaces and/or code that may be operable to transmit and/or receive RF signals adhering to one or more wireless standards such as the LTE standard. The transceiver 122 may comprise multiple RF Rx front-ends 124. Each associated RF Rx front-end is used to process signals over a specific channel such as the channel between a transmit antenna 111a and a receive antenna 121a shown in FIG. 1B.

The multiple RF Rx front-ends 124 may comprise suitable logic, circuitry, interfaces and/or code that may be operable to process RF signals received, for example, over the LTE air interface, via specific antenna-pair such as the transmit antenna (port-0) at the receive antenna 121a (Rx-0). The multiple RF Rx front-ends 124 may be operable to convert the received RF signals to corresponding baseband signals and perform analog-to-digital conversion of the baseband signals. The resulting digital baseband signals may be processed via, for example, pulse shaping and communicated with the baseband processor 128 for further baseband processing.

The RF Tx front-end 126 may comprise suitable logic, circuitry, interfaces and/or code that may be operable to process RF signals for transmission. The RF Tx front-end 126 may be operable to receive digital baseband signals from the baseband processor 128 and perform digital-to-analog conversion of the received digital baseband signals. The RF Tx front-end 126 may be operable to convert the resulting analog baseband signals to corresponding RF signals for transmission via the antennas 121.

The baseband processor 128 may comprise suitable logic, circuitry, interfaces and/or code that may be operable to manage and/or control operations of the RF Rx front-ends 124 and the RF Tx front-end 126, respectively. The baseband processor 128 may be operable to communicate baseband signals with the transceiver 122. The baseband processor 128 may be operable to handle baseband signals to be transferred to the RF Tx front-end 126 for transmission and/or process baseband signals from the RF Rx front-ends 124. The received baseband signals may comprise OFDM signals received from, for example, the base station 110. The received OFDM signals may comprise a plurality of RS tones and a plurality of data OFDM symbols. In this regard, the baseband processor 128 may be operable to perform various baseband procedures such as, for example, channel estimation and/or channel equalization to demodulate the received data OFDM symbols. The RS tones may be utilized in the channel estimation. In this regard, the baseband processor 128 may be operable to estimate channels at corresponds RS tones by performing a masking operation over channel taps (time domain) of the received RS tones. The RS tones may be irregularly spaced in the subcarrier due to, for example, counting out the DC subcarrier as presented in the LTE standard. Accordingly, pointers in the subcarrier of the RS tones may be shifted prior to channel estimation to overcome performance limitations that may exist due to irregular spacing between the RS tones.

The host processor 130 may comprise suitable logic, circuitry, interfaces and/or code that may be operable to manipulate and control operation of the transceiver 122. The host processor 130 may be operable to communicate data with the transceiver 122 to support applications such as, for example, audio streaming on the mobile device 120.

The memory 132 may comprise suitable logic, circuitry, and/or code that may enable storage of information such as executable instructions and data that may be utilized by the host processor 130 as well as the baseband processor 128. The executable instructions may comprise algorithms that may be applied to various baseband signal processes such as channel estimation. The memory 132 may comprise RAM, ROM, low latency nonvolatile memory such as flash memory and/or other suitable electronic data storage.

In an exemplary operation, the multiple RF Rx front-ends 124 may be operable to receive OFDM signals in RF band over the LTE air interface, via various antenna-pair such as the transmit antenna 111a (port-0) at the receive antenna 121a (Rx-0). The received OFDM signals may be converted from the RF band to baseband for further baseband processing. The baseband processor 128 may be operable to utilize RS tones in the corresponding baseband signals to estimate channels at corresponding RS tones in order to demodulate data OFDM symbols. In instances where the RS tones may be irregularly spaced in subcarrier due to, for example, counting out the DC subcarrier as presented in the LTE standard, pointers in subcarrier of the RS tones may be shifted prior to channel estimation to overcome distortions caused by the irregular spacing between the RS tones. The demodulated data OFDM symbols may be communicated with the host processor 130 to support an intended application such as a video conference call on the mobile device 120.

Figure 2:
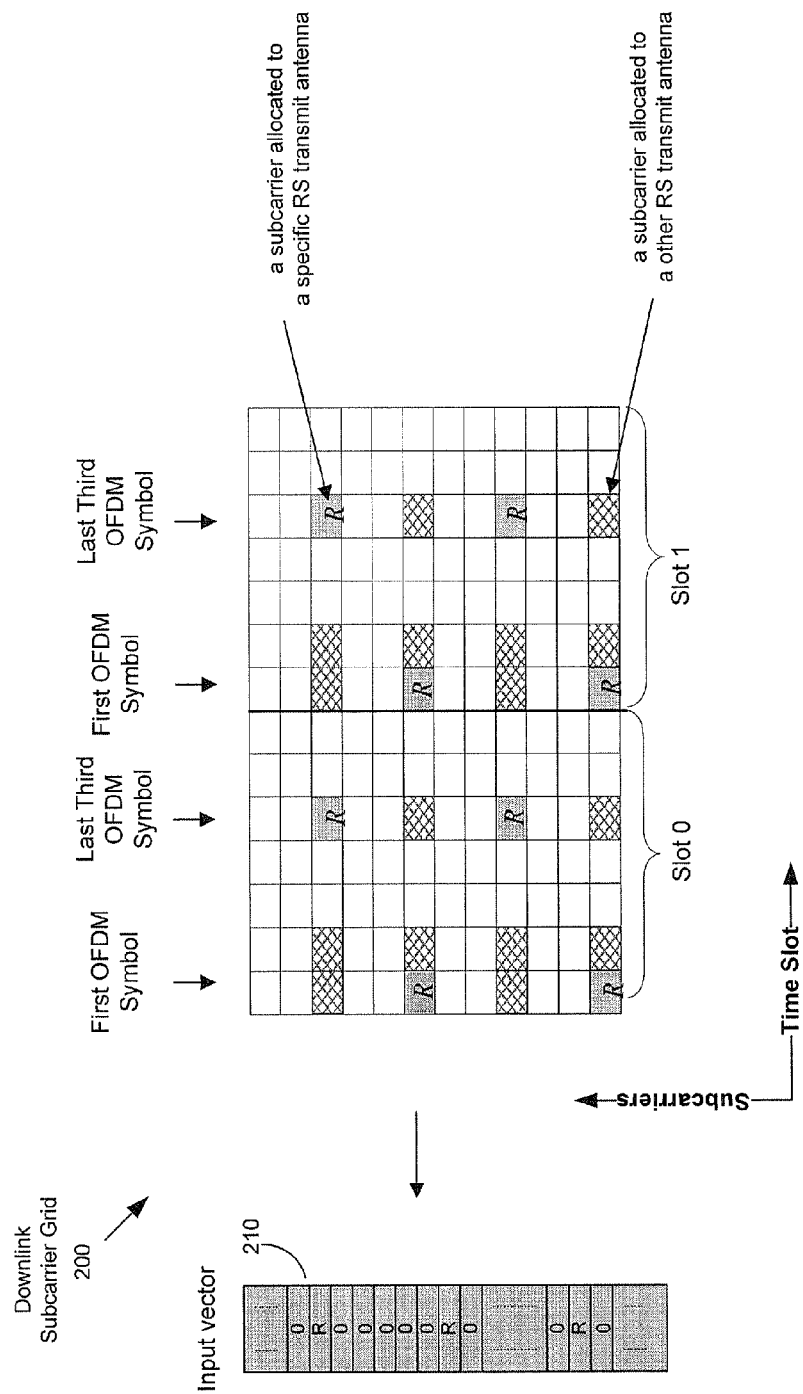
FIG. 2 is a block diagram illustrating an exemplary downlink subcarrier grid that shows occupations of embedded OFDM reference signals, in accordance with an embodiment of the invention.

FIG. 2 is a block diagram illustrating an exemplary downlink subcarrier grid that shows occupations of embedded OFDM reference signals, in accordance with an embodiment of the invention. Referring to FIG. 2, there is shown a downlink subcarrier grid 200. The downlink subcarrier grid 200 comprises a plurality of RS tones that may be located or inserted in a predetermined grid of tones (subcarriers). In the LTE standard, the plurality of RS tones may be placed and transmitted in, for example, the first OFDM symbol of one slot and/or on the third last OFDM symbol.

Processing a specific antenna-pair, say the transmit antenna 111a (port-0) at the receive antenna 121a (Rx-0), may be started by processing the signals that are received through the receive antenna 121a (Rx-0). After extracting a set of RS tones from the received signals, an input vector 210 of length Ns is created, where parameter Ns represents number of subcarriers. The input vector 210 may represent channel impulse responses at the RS frequencies and zeros elsewhere. The extracted set of RS tones within input vector 210 are associated with a set of location indices (or pointers or addresses) within the input vector 210. The set of pointers may also represent the RS frequencies.

In some cases a gap or irregularity in the spacing of the extracted RS tones may occur. For example, in the LTE standard the used-tones may range from 0 to N−1 tones (a subset of 0:Ns−1 tones, N is a positive integer and N<Ns); with N/2 tones below DC (DC is the zero frequency) and N/2 tones above DC. L frequencies of the extracted RS tones are mapped to the used-tone range of 0:N−1 by omitting the DC tone from the used-tone range. This RS mapping has a step of, for example, 6-tones counting over the range of 0:N−1, but it has a jump of one tone when counting the physical tones. For example, the extracted RS tones located at subcarriers [. . . , −6, 0, 7, . . . ] may be mapped or shifted to subcarriers [. . . , −6, 0, 6, . . . ] to achieve regularly spaced RS tones in subcarrier. With the RS mapping, the gap or irregularity in the spacing of the extracted RS tones may be corrected and minimize the distortion created in filtration and/or smoothing taking place in channel estimation process. In this regard, an IFFT operation may be applied on the pointer shifted plurality of channel RS tones for the channel impulse response. Desired channel taps of the resulting channel impulse response may be weighted by a mask that zeros out the undesired channel taps and/or channel tap replicas of the resulting channel impulse response.

Figure 3:
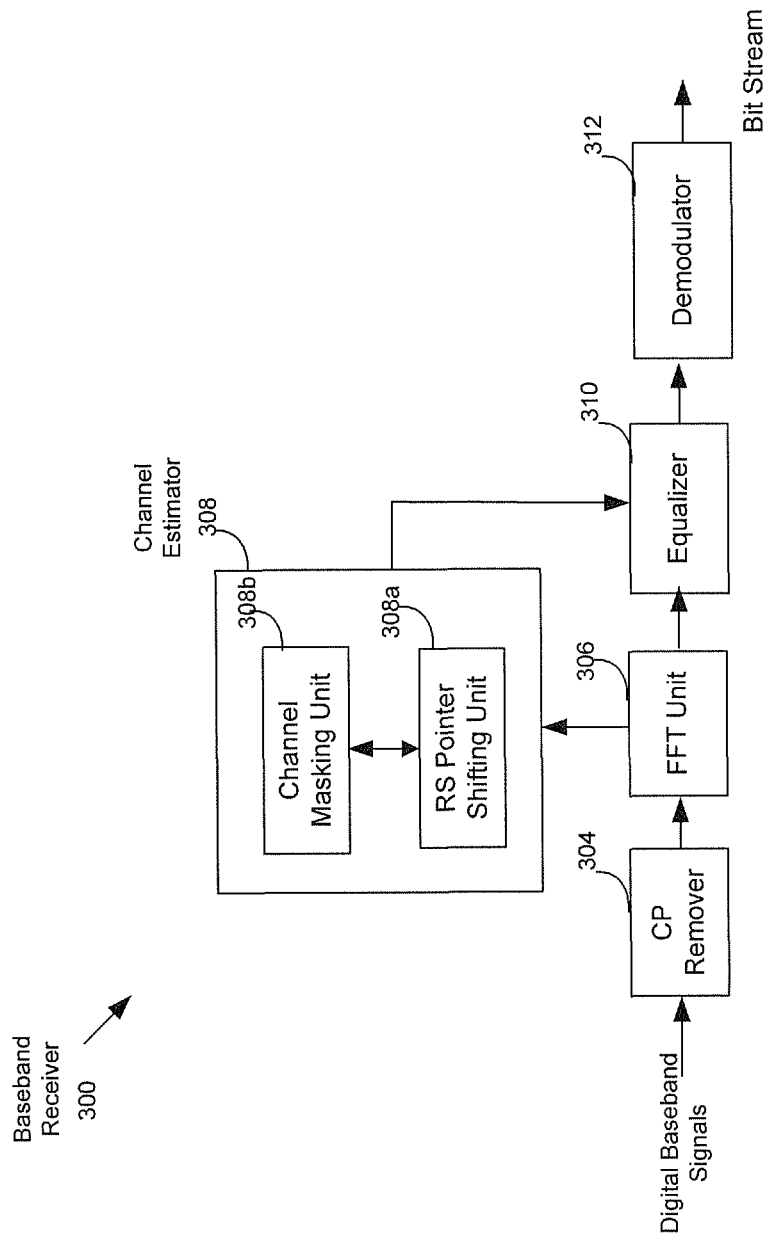
FIG. 3 is a block diagram illustrating an exemplary baseband receiver that is operable to perform channel estimation using a masking operation in time domain, in accordance with an embodiment of the invention.

FIG. 3 is a block diagram illustrating an exemplary baseband receiver that is operable to perform channel estimation using a masking operation in time domain, in accordance with an embodiment of the invention. Referring to FIG. 3, there is shown a cyclic prefix (CP) remover 304, a FFT unit 306, a channel estimator 308, an equalizer 310 and a demodulator 312. The channel estimator 310 comprises a reference signal (RS) pointer shifting unit 310a and a channel masking unit 310b.

The CP remover 304 may comprise suitable logic, circuitry, interfaces and/or code that may be operable to remove cyclic prefix (CP) components from digital baseband signals, which corresponds to RF signals received via a specific antenna such as the antenna 121a. The CP components comprise copies of desired signal tail. The CP components may be inserted at the beginning of each OFDM symbol at transmitter to absorb or remove multipath interferences. The duration of the CP components in each OFDM symbol may be chosen so that it is larger than the expected channel delay spread to eliminate multipath interference.

The FFT unit 306 may comprise suitable logic, circuitry, interfaces and/or code that may be operable to perform fast Fourier transform (FFT) over OFDM symbols from the CP remover 304. The FFT unit 306 may be operable to convert time domain samples of the OFDM symbols to corresponding frequency domain samples for frequency domain channel equalization.

The channel estimator 308 may comprise suitable logic, circuitry, interfaces and/or code that may be operable to estimate channel conditions such as, for example, Signal-to-Interference and Noise Ratio (SINR), attenuation of high subcarriers, and/or phase shift using received RS tones. The received RS tones may be extracted from the output of the FFT unit 306 and may be used for channel estimation. Estimated channel conditions may be communicated with the equalizer 310 for channel equalization to remove, for example, inter-symbol interferences within received OFDM signals. With regard to the LTE standard, the received RS tones may be irregularly spaced in subcarrier due to the DC subcarrier counting out. In order to compensate distortions to channel estimation due to the irregular RS tone spacing, pointers of the received RS tones may be relocated via the RS pointer shifting unit 308a prior to channel estimation.

The RS pointer shifting unit 308a may comprise suitable logic, circuitry, interfaces and/or code that may be operable to shift pointers of RS tones in subcarrier. In this regard, the RS pointer shifting unit 308a may be operable to shift irregularly spaced RS tones to regularly spaced RS tones in subcarrier to overcome distortions to channel estimation. The regularly spaced RS tones may be converted to time domain samples (channel taps) and used for channel estimation by the channel masking unit 308b. The RS pointer shifting unit 308a may be operable to back shift or reverse shift the pointer shifted RS tones to, for example, the original locations of the received RS tones for frequency domain channel equalization via the equalizer 310.

The channel masking unit 308b may comprise suitable logic, circuitry, interfaces and/or code that may be operable to perform channel estimation in time domain using channel tap masking operation. The channel tap masking operation may be performed by applying a mask over channel taps of the pointer shifted RS tones from the RS pointer shifting unit 308a. In this regard, the channel masking unit 308b may be operable to first convert the pointer shifted RS tones into time domain samples (channel taps) using an IFFT operation. The pointer shifted RS tones may be windowed or truncated to take a portion of the pointer shifted RS tones for the IFFT operation. The size of the window, which may is utilized for the windowing or truncation, may be determined based on, for example, channel conditions. The channel taps of the pointer shifted RS tones may comprise desired channel taps, undesired channel taps, and/or channel tap replicas. The channel taps may be processed via an element-wise product. For example, the desired channel taps may be weighted using non-zero mask values. The undesired channel taps and/or the channel tap replicas may be weighted using a zero mask value. The masked channel taps may be converted back to corresponding frequency domain samples using a FFT operation for frequency domain channel equalization via the equalizer 310. In this regard, the corresponding frequency domain samples may be back-shifted prior to channel equalization.

The equalizer 310 may comprise suitable logic, circuitry, interfaces and/or code that may be operable to perform interference suppression and/or compensation in frequency domain to remove inter-symbol interferences (ISI) from OFDM symbols of received signals.

The demodulator 312 may comprise suitable logic, circuitry, interfaces and/or code that may be operable to demodulate received data streams to restore corresponding transmitted data.

In an exemplary operation, received OFDM baseband signals may be communicated with the CP remover 304. The CP remover 304 may be operable to remove CP components from the OFDM baseband signals and communicate with the FFT unit 306. The FFT unit 306 may be operable to convert time domain samples associated with OFDM symbols of the OFDM baseband signals to corresponding frequency domain samples for frequency domain channel equalization. The channel estimator 308 may be operable to extract RS tones from the resulting frequency domain samples at the output of the FFT unit 306. Pointers in subcarrier of the extracted RS tones may be shifted via the RS pointer shifting unit 308a to compensate distortions to channel estimation due to irregularly spaced RS tones. The pointer shifted RS tones may be used for channel estimation. In this regard, channels taps of the pointer shifted RS tones may be masked in time domain via the channel masking unit 308b.

The channel masking unit 308b may be operable to convert the masked channel taps into corresponding frequency domain samples to provide estimated channel conditions for frequency domain channel equalization. In this regard, the corresponding frequency domain samples of the masked channel taps may be back shifted in subcarrier prior to channel equalization. The equalizer 310 may be operable to remove inter-symbol interferences (ISI) from the received OFDM signals using the estimated channel conditions. The data OFDM symbols may be demodulated via the demodulator 312, accordingly.

Figure 4:
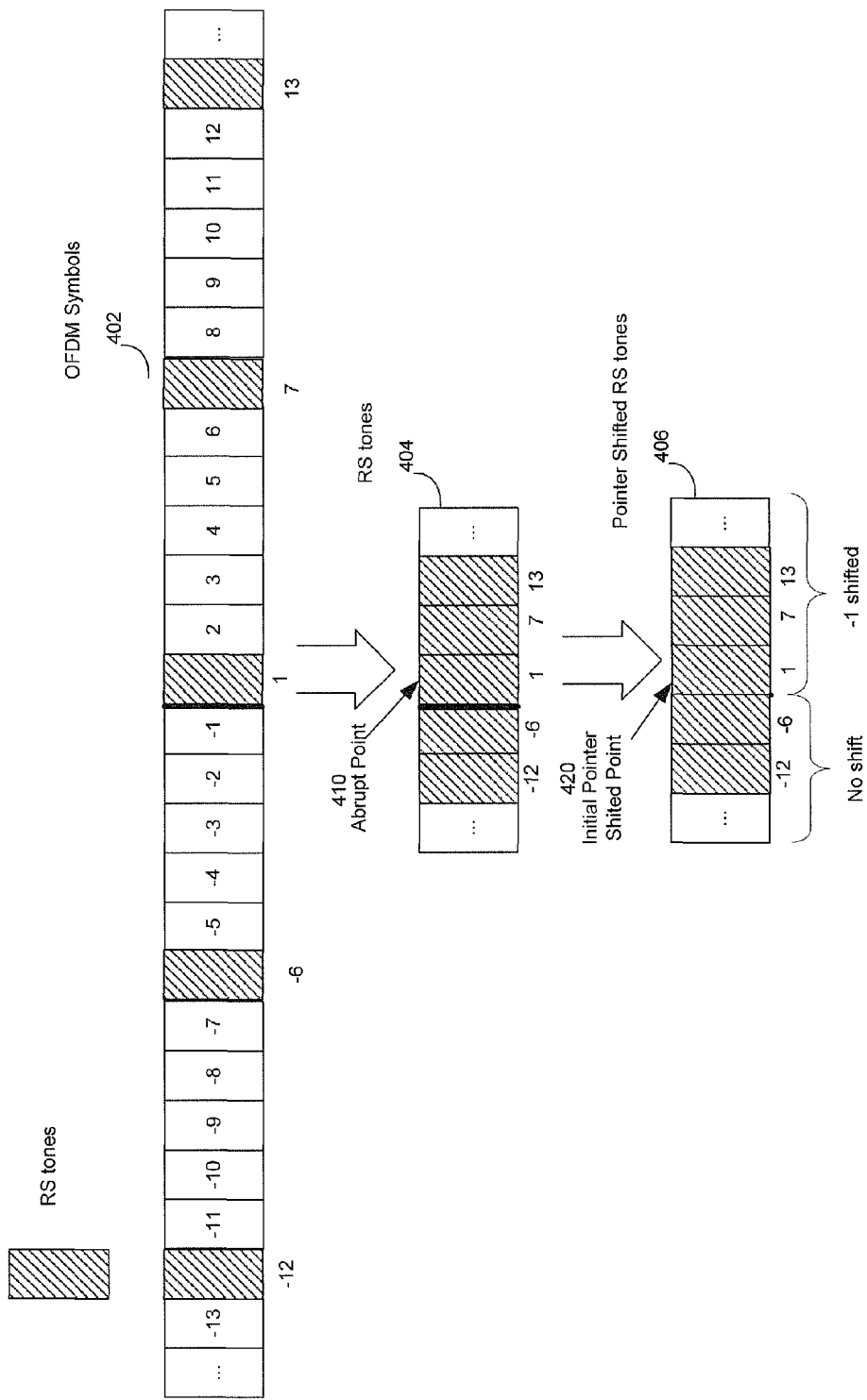
FIG. 4 is a block diagram illustrating an exemplary reference tone pointer shifting operation that is utilized in channel estimation, in accordance with an embodiment of the invention.

FIG. 4 is a block diagram illustrating an exemplary reference tone pointer shifting operation that is utilized in channel estimation, in accordance with an embodiment of the invention. Referring to FIG. 4, there are shown OFDM symbols 402, RS tones 404, and pointer shifted RS tones 406. The OFDM symbols 402 may comprise OFDM symbols from the FFT unit 306, where each of the OFDM symbols 402 is counted or indexed in subcarrier with either positive or negative integers at the zero crossing point of the DC subcarrier. Due to the DC subcarrier counting out in the LTE standard, the OFDM symbols 402 may be counted or indexed in subcarrier as, for example, [. . . , −13, −12, . . . , −3, −2, −1, 1, 2, 3, . . . , 12, 13, . . . ]. The RS tones 404 embedded inside the OFDM symbols 402 may be counted in subcarrier as [. . . , −12, −6, 1, 7, 13, . . . ]. An abrupt point 410 may be presented in RS tone spacing and may lead to distortions to channel estimation. In this regard, pointers of the RS tones 404 may be relocated in subcarrier by shifting one tone lower for each of the positive indexed RS tones. For example, the positive indexed RS tones at [1, 7, 13, . . . ] are relocated to subcarriers at [0, 6, 12, . . . ] by shifting one tone lower. Accordingly, the resulting pointer shifted RS tones 406 may be regularly or evenly spaced in subcarrier and may be communicated with the channel masking unite 308a for channel estimation.

Figure 5:
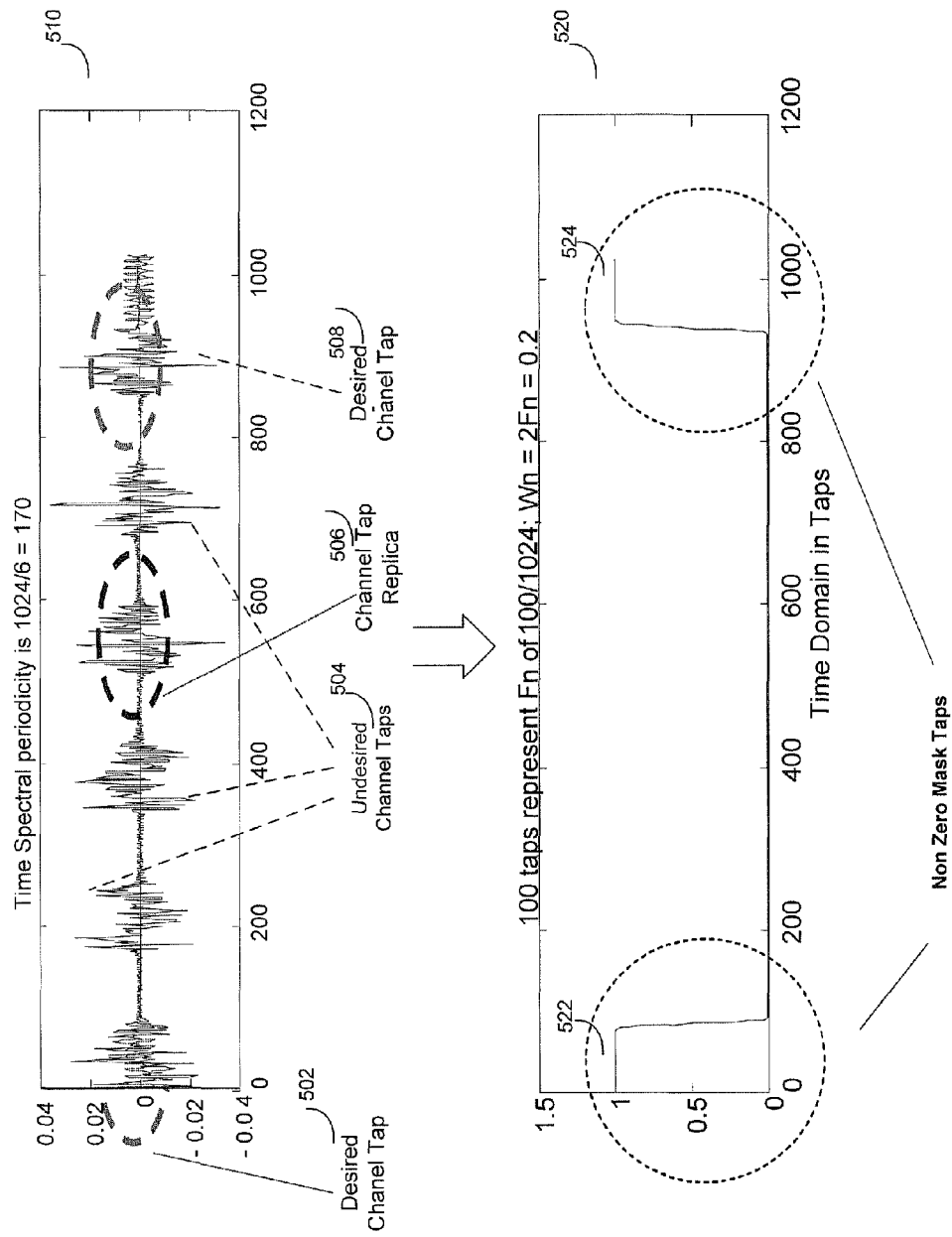
FIG. 5 is a block diagram illustrating an exemplary channel tap masking operation that is utilized in channel estimation, in accordance with an embodiment of the invention.

FIG. 5 is a block diagram illustrating an exemplary channel tap masking operation that is utilized in channel estimation, in accordance with an embodiment of the invention. Referring to FIG. 5, there is shown a channel response plot 502 and a masked channel response plot 504. The channel response plot 502 may represent time domain samples of a pointer shifted RS tone from the RS pointer shifting unit 308a. The channel response plot 502 may comprise desired taps, undesired channel taps and/or channel tap replicas, of which, desired taps 502 and 508, undesired channel taps 504, and a channel tap replica 506 are illustrated with respect to FIG. 5. In this regard, the channel masking unit 308b may be operable to apply a mask to channel taps of the channel response plot 502 to eliminate the undesired channel taps 504 and the channel tap replica 506. The channel tap masking operation may be performed using element-wise product in time domain. The desired channel taps 502 and 508 may be weighted with non-zero mask values. The undesired channel taps 504 and the channel tap replica 508 may be weighted with zero mask values. To reduce storage and/or lower computational complexity in channel estimation, only non-zero mask values may be stored and applied. Accordingly, the resulting masked channel response plot 504 may comprise desired channel taps masked or weighted with non-zero mask values such as masked channel taps 522 and 524. The masked channel response plot 504 may be utilized for channel equalization via the equalizer 310.

Figure 6:
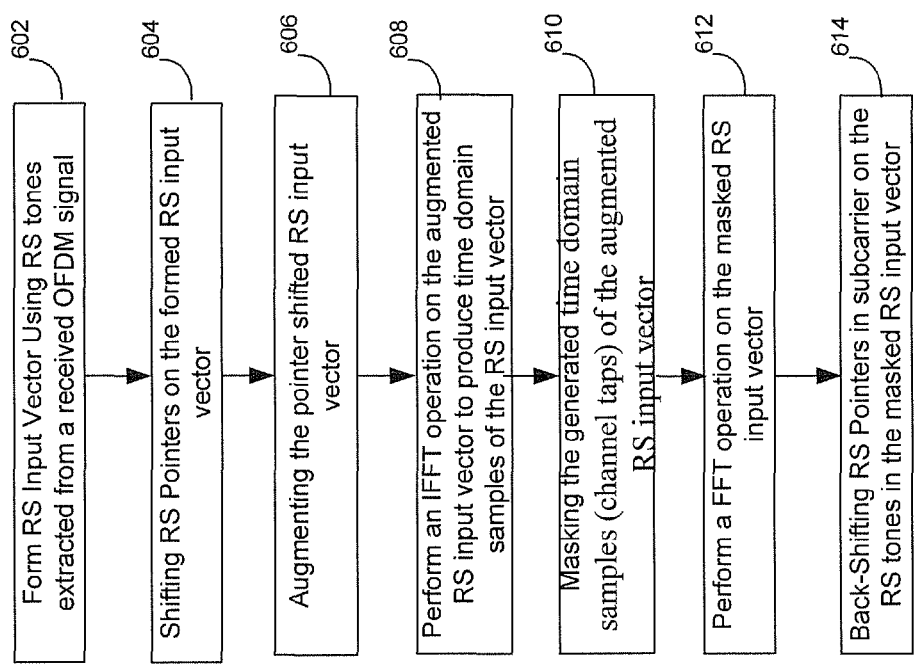
FIG. 6 is a flow chart illustrating an exemplary channel estimation procedure that masks channel taps in time-domain using pointer shifted reference tones, in accordance with an embodiment of the invention.

FIG. 6 is a flow chart illustrating an exemplary channel estimation procedure that masks channel taps in time-domain using pointer shifted reference tones, in accordance with an embodiment of the invention. Referring to FIG. 6, the exemplary steps may start with the step 602. In step 602, RS tones may be extracted from frequency samples at the output of the FFT unit 306 for a received OFDM signal to form a RS input vector for channel estimation. In step 604, pointers of the extracted RS tones in the RS input vector may be shifted in subcarrier for regularly spaced RS tones. In step 606, the resulting pointer shifted RS input vector is augmented on both sides of the pointer shifted RS input vector so as to reduce edge effects in a subsequent IFFT operation. For example, the pointer shifted RS input vector may be augmented via, for example, by repeating the last several left RS tones and the last several right RS tones, respectively. Other augmentation techniques may utilize extrapolation, windowing, etc. In step 608, the RS tones in the augmented RS input vector may be converted into corresponding time domain samples via using IFFT operation. In step 610, the time domain samples (channel taps) of the RS tones in the augmented RS input vector may be masked. In this regard, desired channel taps may be weighted with non-zero mask values. Undesired channel taps and/or channel tap replicas may be weighted with zero mask values. In step 612, the masked channel response may be converted into corresponding frequency domain samples via a FFT operation for channel equalization. In step 614, pointers of the corresponding frequency domain samples may be back-shifted in subcarrier and provided to the equalizer 310 for frequency domain channel equalization to remove ISI interferences.

In various exemplary aspects of the method and system for low complexity channel estimation in OFDM systems using circular convolution, a mobile device such as the LTE mobile device 120a in the OFDM communication system 100 may be operable to receive an OFDM signal from the LTE base station 110. The received OFDM signal may comprise a plurality of RS tones and data OFDM symbols. The plurality of received RS tones may be extracted and utilized for channel estimation. The channel estimation may be performed by masking a channel response of the extracted plurality of RS tones as presented with respect to, for example. FIG. 5. The extracted plurality of RS tones may be irregularly spaced in subcarrier due to, for example, counting out the DC subcarrier required in the LTE standard. The irregular subcarrier spacing of the extracted plurality of RS tones may cause distortions to channel estimation. Accordingly, as described with respect to, for example FIG. 3, FIG. 4 and FIG. 6, the RS pointer shifting unit 308b may be operable to shift pointers of the extracted plurality of RS tones in subcarrier so that the extracted plurality of RS tones are spaced in the subcarrier at regular intervals. In this regard, pointers of associated positive counted or indexed subcarriers of the extracted plurality of RS tones may be shifted one subcarrier lower. No pointer shifting may be performed on associated negative counted or indexed subcarriers of the extracted plurality of RS tones. As described with respect to FIG. 3, FIG. 5 and FIG. 6, the channel impulse responses of the pointer shifted plurality of RS tones may be determined by applying IFFT operation on the pointer shifted plurality of RS tones. The channel masking unit 308*a* may be operable to apply a mask on associated channel taps of the determined channel responses. Desired channel taps of the determined channel impulse responses may be weighted using non-zero masking values. Undesired channel taps and/or channel tap replicas of the determined channel impulse responses may be weighted using a zero masking value. The masked channel impulse responses may be converted via FFT to corresponding frequency domain samples for frequency domain equalization. Pointers of the corresponding frequency domain samples may be shifted in subcarrier back to the pointers of the plurality of extracted RS tones prior to channel equalization.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for low complexity channel estimation in OFDM systems using circular convolution.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for forming a channel estimate in an orthogonal frequency division multiplexing (OFDM) communication device, the method comprising:
receiving an OFDM signal comprising a plurality of reference signal (RS) tones and a plurality of data symbols;
extracting said plurality of RS tones from said received OFDM signal to form an input vector;
inverse Fourier transforming said input vector to form a time domain representation of said channel estimate;
applying a mask to taps of said time domain representation of said channel estimate to form a masked time domain representation of said channel estimate;
Fourier transforming said masked time domain representation of said channel estimate to form a frequency domain representation of said channel estimate; and
before inverse Fourier transforming said input vector, shifting an RS tone from an original position in said input vector such that said plurality of RS tones are evenly spaced.

2. The method according to claim 1, wherein shifting said RS tone comprises:
shifting said RS tone to a new position, in said input vector, that is associated with a subcarrier one subcarrier lower in frequency than a subcarrier over which said RS tone is received.

3. The method according to claim 1, wherein applying said mask to taps of said time domain representation of said channel estimate comprises:
weighting desired taps of said time domain representation of said channel estimate using non-zero masking values.

4. The method according to claim 1, wherein applying said mask to taps of said time domain representation of said channel estimate comprises:
weighting undesired taps of said time domain representation of said channel estimate to reduce or remove said undesired taps.

5. The method according to claim 1, wherein applying said mask to taps of said time domain representation of said channel estimate comprises:
weighting tap replicas of said time domain representation of said channel estimate to reduce or remove said tap replicas.

6. The method according to claim 1, further comprising:
shifting said RS tone in the channel estimate back to said original position.

7. The method according to claim 1, further comprising:
augmenting said input vector before inverse Fourier transforming said input vector to reduce edge effects.

8. The method according to claim 1, further comprising:
repeating RS tones at an end of said plurality of RS tones in said input vector.

9. A system for forming a channel estimate in an orthogonal frequency division multiplexing (OFDM) communication device, the system comprising:
a receiver configured to receive an OFDM signal comprising a plurality of reference signal (RS) tones and a plurality of data symbols;
an inverse Fourier transform unit configured to inverse Fourier transform an input vector comprising said plurality of RS tones extracted from said received OFDM signal to form a time domain representation of said channel estimate;
a masking unit configured to apply a mask to taps of said time domain representation of said channel estimate to form a masked time domain representation of said channel estimate;
a Fourier transform unit configured to Fourier transform said masked time domain representation of said channel estimate to form a frequency domain representation of said channel estimate; and
a shifting unit configured to shift an RS tone from an original position in said input vector, before said inverse Fourier transform unit inverse Fourier transforms said input vector, such that said plurality of RS tones are evenly spaced.

10. The system according to claim 9, wherein said shifting unit is configured to shift said RS tone to a new position, in said input vector, that is associated with a subcarrier one subcarrier lower in frequency than a subcarrier over which said RS tone is received.

11. The system according to claim 9, wherein said masking unit is further configured to weight desired taps of said time domain representation of said channel estimate using non-zero masking values.

12. The system according to claim 9, wherein said masking unit is further configured to weight undesired channel taps of said time domain representation of said channel estimate to reduce or remove said undesired taps.

13. The system according to claim 9, wherein said masking unit is further configured to weight channel tap replicas of the time domain representation of said channel estimate to reduce or remove said channel tap replicas.

14. The system according to claim 9, wherein said shifting unit is configured to shift said RS tone in the channel estimate back to said original position.

15. The system according to claim 9, wherein said shifting unit is further configured to:
augment said input vector before inverse Fourier transforming said input vector to reduce edge effects.

16. The system according to claim 9, wherein said shifting unit is further configured to:
repeat RS tones at an end of said plurality of RS tones in said input vector.

17. A system for forming a channel estimate in an orthogonal frequency division multiplexing (OFDM) communication device, the system comprising:
an inverse Fourier transform unit configured to inverse Fourier transform an input vector comprising a plurality of RS tones extracted from a received OFDM signal to form a time domain representation of said channel estimate;
a masking unit configured to apply a mask to taps of said time domain representation of said channel estimate to form a masked time domain representation of said channel estimate; and
a shifting unit configured to shift an RS tone from an original position in said input vector, before said inverse Fourier transform unit inverse Fourier transforms said input vector, such that said plurality of RS tones are evenly spaced.

18. The system according to claim 17, wherein said shifting unit is configured to shift said RS tone to a new position, in said input vector, that is associated with a subcarrier one subcarrier lower in frequency than a subcarrier over which said RS tone is received.

19. The system according to claim 17, wherein said shifting unit is configured to shift said RS tone in the channel estimate back to said original position.

20. The system according to claim 17, wherein said masking unit is further configured to weight undesired channel taps of said time domain representation of said channel estimate to reduce or remove said undesired taps.

\* \* \* \* \*